Figure 1:
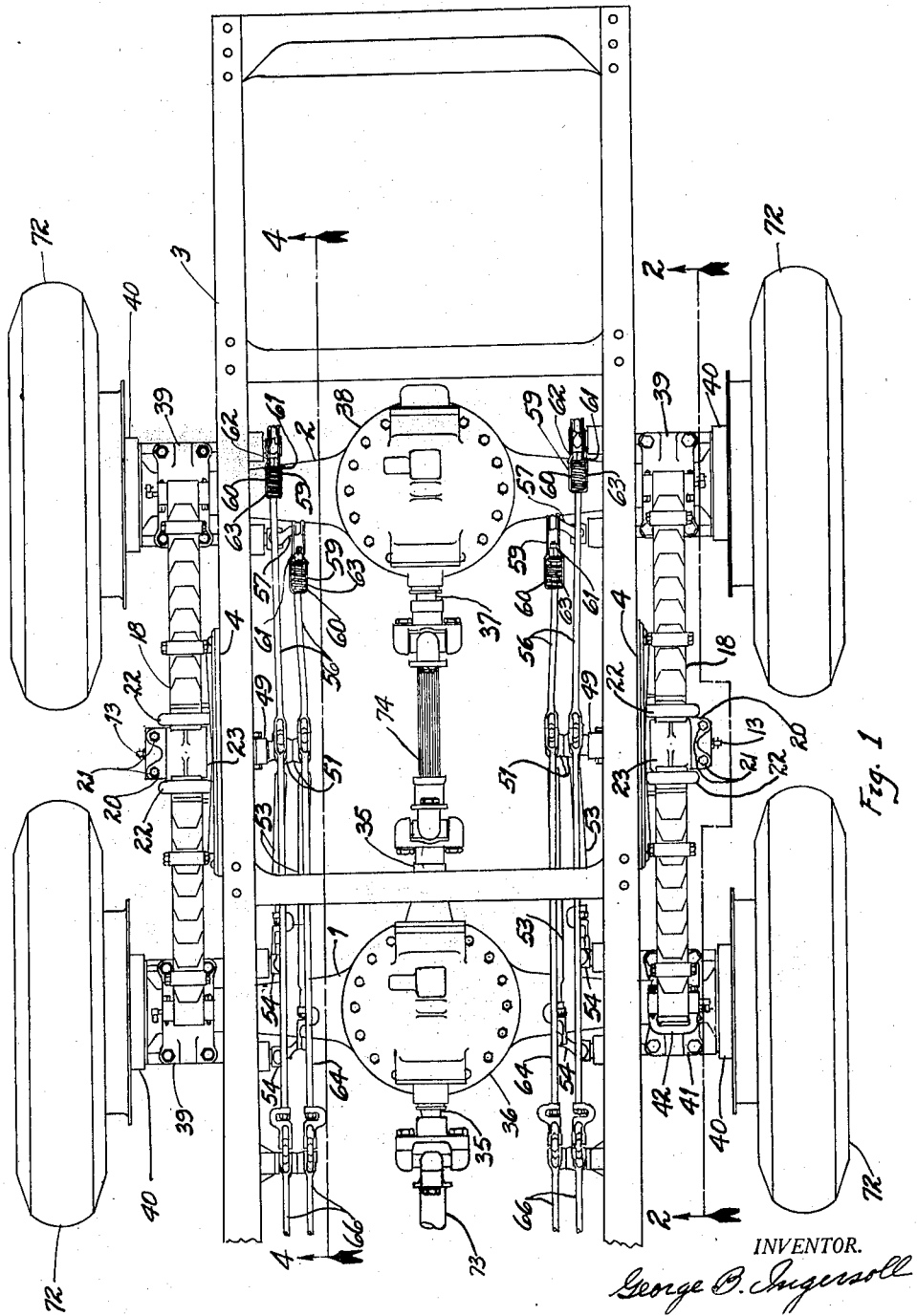

Sept. 6, 1927.  
G. B. INGERSOLL  
VEHICLE CONSTRUCTION  
Filed July 23, 1926

1,641,333

4 Sheets-Sheet 1

INVENTOR.  
George B. Ingersoll

Sept. 6, 1927.　　　G. B. INGERSOLL　　　1,641,333
VEHICLE CONSTRUCTION
Filed July 23, 1926　　　4 Sheets-Sheet 2
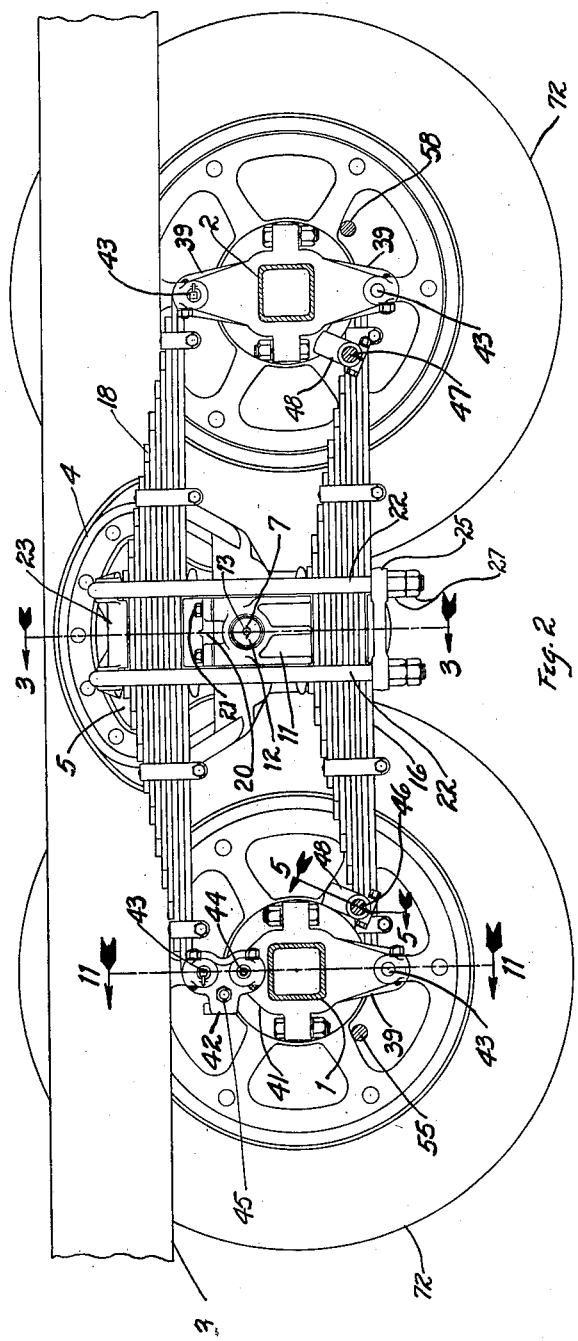
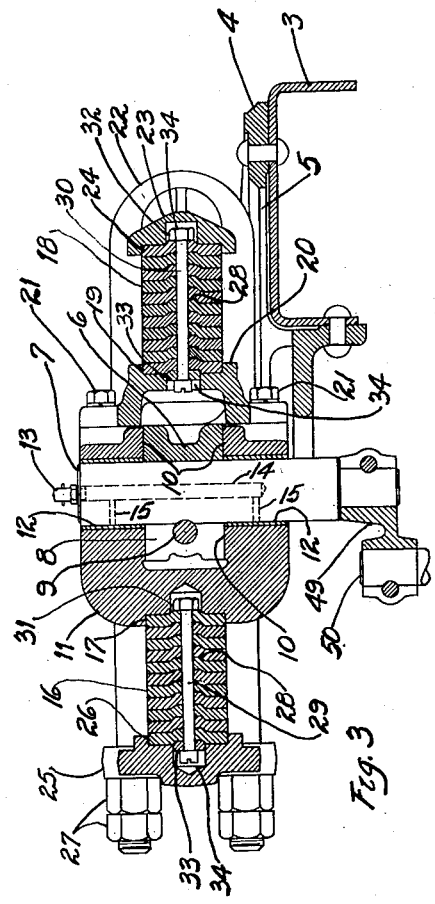
INVENTOR.
George B. Ingersoll Sept. 6, 1927.
G. B. INGERSOLL
1,641,333
VEHICLE CONSTRUCTION
Filed July 23, 1926
4 Sheets-Sheet 3
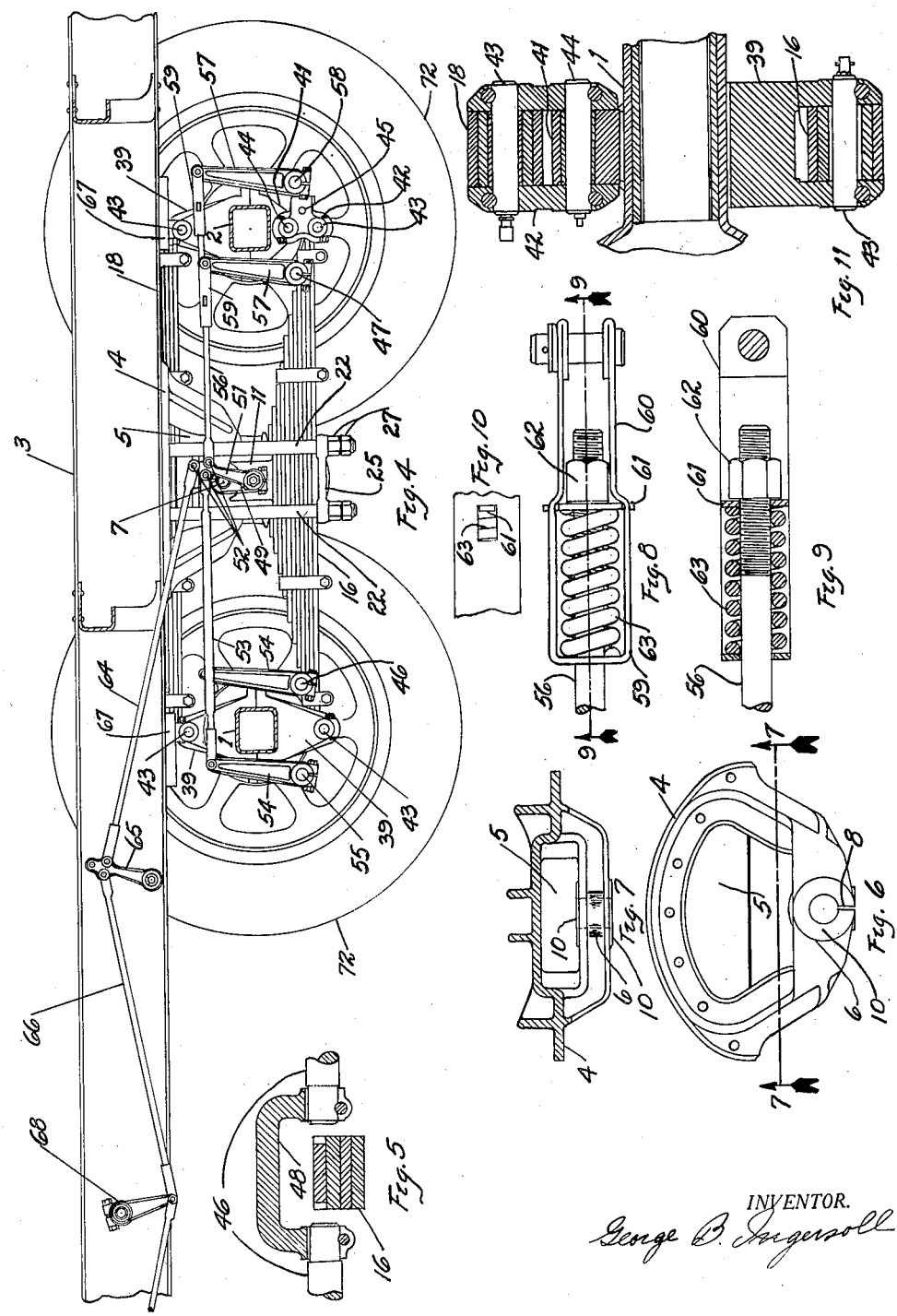
INVENTOR.
George B. Ingersoll

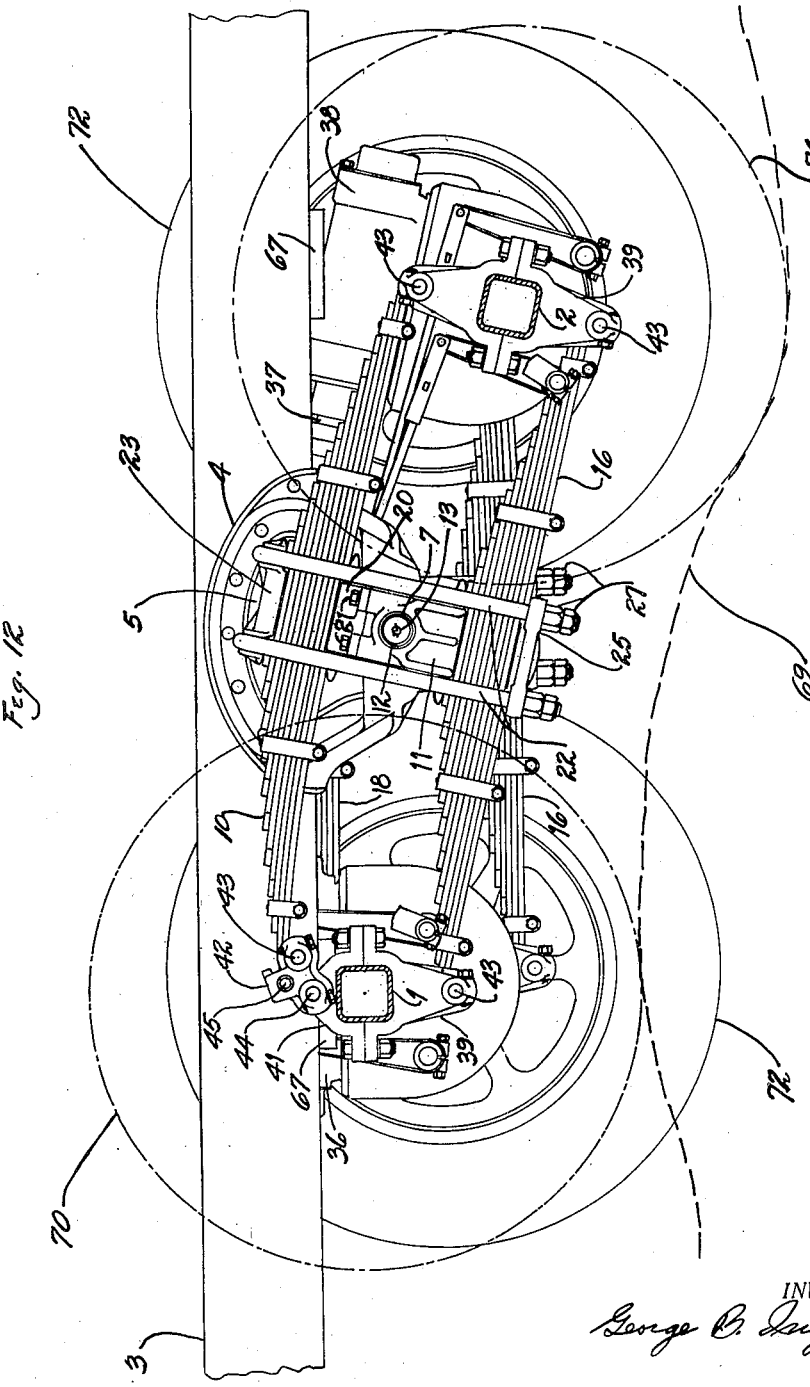

Patented Sept. 6, 1927.

1,641,333

UNITED STATES PATENT OFFICE.

GEORGE B. INGERSOLL, OF DEARBORN, MICHIGAN, ASSIGNOR, BY MESNE ASSIGNMENTS, TO FEDERAL MOTOR TRUCK COMPANY, OF DETROIT, MICHIGAN.

VEHICLE CONSTRUCTION.

Application filed July 23, 1926. Serial No. 124,419.

My invention relates to certain new and useful improvements in the rear construction of motor trucks; and the objects of my improvements are, first to provide a two axle suspension that will give ample bearing surfaces at the axle connecting points; second, to provide maximum bearing surfaces at the important point where the dual axles are connected to the frame brackets; third, to provide means for taking the torque reaction at a plurality of points near the ends of the axles; fourth, to provide a construction that will allow for the use of the same axle housings as commonly used in single rear axle construction; fifth, to provide a construction that will give better wheel tractive ability; sixth, to provide proper shackle construction for the installation of dual axles; seventh, to provide a brake operating hookup that will allow for equalization of braking effort on all wheels; eighth, to provide for neutralizing the torque, developed in the housing, by means of ordinary supporting springs; ninth, to reduce the unit tire pressures on the road surfaces for given loads; tenth, to reduce skidding of the vehicle wheels; eleventh, to provide for easier vehicle riding qualities; twelfth, to provide for a more economical six wheel construction through the use of lighter units; thirteenth, to provide for the cushioning of all loads on the axles; and fourteenth, to provide for the positive locking of all load carrying members.

I attain these objects by the mechanism illustrated in the accompanying drawings, in which—

Figure 1 is a plan view of the rear axle installation as applied to a motor truck; Fig. 2, a vertical section, shown horizontally on the drawing, of the axles on the line 2—2, Fig. 1; Fig. 3, a vertical section on the line 3—3, Fig. 2; Fig. 4, a vertical section on the line 4—4, Fig. 1; Fig. 5, a vertical section on the line 5—5, Fig. 2; Fig. 6, a front elevation of a spring trunnion bracket; Fig. 7, a side section on the line 7—7, Fig. 6; Fig. 8, a plan view of a brake rod spring yoke; Fig. 9, a vertical section on the line 9—9, Fig. 8; Fig. 10, a side elevation of a portion of the brake rod spring yoke; Fig. 11, a vertical section on the line 11—11, Fig. 2; and Fig. 12, a vertical section of the axles, showing the action of the springs when travelling over irregular road surfaces, Similar numerals refer to similar parts throughout the several views.

Figures 1 and 2 show in detail the method of connecting the two rear axles 1 and 2 to the motor truck frame 3. A frame bracket 4 is securely fastened to the frame 3 at a point midway between the rear axles 1 and 2. The frame bracket 4 is made with an open central portion 5 in its flange and has a boss 6 at its lower end. The trunnion shaft 7 is securely locked in the boss 6, which can be slotted as at 8, and is securely clamped and locked in position by the bolt 9. The boss 6 has large thrust faces 10 which are fitted between similar thrust faces on the lower spring seat 11. Bushings 12 are pressed into the spring seat 11 and form the bearings for the trunnion shaft 7. A grease connection 13 connects with the holes 14 and 15 which deliver the lubricant to the loaded side of seat 11. The upper spring 18 fits within a similar groove 19 on the upper spring seat 20 which is fastened to the lower spring seat 11 by the bolts 21. The spring clips 22 are held in proper alignment by the upper clip spacer 23 which also has a groove 24 for retaining the spring 18. The lower end of the spring clips 22 pass through the clamping plate 25 which also has a groove 26 for retaining the lower spring 16. The springs 18 and 16 together with the clamp plate 25 and clip spacer 23 are securely held on to the spring seats 20 and 11 by means of the double nuts 27 on the spring clips 22. It is to be noted that the leaves of the springs 16 and 18 are all locked together by an upset portion 28 around the center bolts 29 and 30. The upset portion of the upper plate of each spring 18 and 16 fits respectively into a countersunk hole 31 in the lower spring seat 11 and 32 in the upper clip spacer 23. This securely locks the springs 18 and 16 to their seats. To further accomplish this with the lower plates of the springs 18 and 16, washers 33 are inserted under the heads of the center bolts 29 and 30, the said washers 33 fitting respectively into counterbored holes 34 in the spring seat 20 and clamp plate 25. It is to be noted that the spring seat 20 is constructed separately from the spring seat 11 in order to assemble the spring seat 11 over the boss 6 on the frame bracket 4, the spring seat 20 being bolted to the spring seat 11. The spring seat 11, being made in the form of a yoke, allows for the spreading of the trunnion shaft bearings 12, thus giving a very rigid and efficient bearing mounting at the highest stressed point of load application, and eliminating a source of weakness in this type of construction as used in six wheel trucks.

It is to be noted that the axles 1 and 2, as shown, are rear axle units as they are ordinarily used in single rear axle installations in four wheel trucks, with the exception that the axle 1, which is the forward axle, has a double end worm 35 suitably mounted in the worm and gear assembly 36 instead of a single end worm 37 as shown in the worm and gear assembly 38 in the rear axle 2. The substitution of the double end worm and gear assembly 36 in place of the single end worm assembly 38 renders a single rear axle as used in four wheel trucks available for use as the forward driving axle in six wheel trucks which, together with the use of the rear driving axle exactly as used in four wheel trucks, makes for the economical manufacture of four and six wheel trucks with a minimum amount of inventory stock for the manufacturer. The propeller shaft 73 which connects with the transmission and motor, not shown, directly drives the forward axle 1 and, through the double end worm 35, and the propeller shaft 74 drives the rear axle 2.

It is to be noted that the driving torque reaction is taken entirely by the springs 16 and 18. This is accomplished by the brackets 39 which are bolted together around the housing of the axles 1 and 2 at a point close to the brake spiders 40 at the outer extremity of the axles 1 and 2. It is to be particularly noted that I fasten the two springs 16 and 18 on one side by means of two of the brackets 39 on the rear driving axle 2 and one of the brackets 39 on the under side of the front driving axle 1. On the upper side of the front driving axle 1 a shorter bracket 41 is used to which is fastened a spring shackle 42. The use of this one shackle at one end of one of the springs only on one side makes possible the use of the two springs on one side for taking the torque driving reaction. The shackle 42 allows the springs 16 and 18 and spring seat 11 with its attached parts to oscillate on the trunnion shaft 7 when travelling over uneven road surfaces as shown in Fig. 12. The eyes of the springs are retained by and oscillate on the spring pins 43 which are locked in the brackets 39 and shackle 42. The pin 44 is also locked in the lower part of the shackle 42 and allows for the oscillation of the shackle 42 in the bracket 41.

This same installation of the three brackets 39 and the one bracket 41 together with the one shackle 42 is repeated on the other side of the truck with the exception that the shackle 42 is placed on the lower side of the rear driving axle 2. This assembly of one shackle 42 at opposite corners of the four driving wheel installation one above and one below the axle, allows for any displacement of the centers of the spring pins 43 in their oscillating travel about the trunnion shaft 7 center to be taken at one end of each axle. The three remaining spring connections to each axle, one on the shackle side and two on the side of the vehicle opposite from the shackle 42, give three points for taking the driving torque reaction at the extreme ends of the axle housings. Taking the driving torque through the springs in this way eliminate the shock of starting and stopping with consequent long life for the driving axle assembly. Also the distribution of the axle driving effort through two springs to the trunnion 7 and there to the frame 3 give good alignment to the wheels 72 when turning corners with consequent efficient tractive ability.

The shackles 42 have a bolt 45 which is used for bringing the thrust faces closer to the spring eyes to avoid spring rattles at this vital point.

The axles 1 and 2 used in either one or two driving axle installations with double springs at each end of the axles have brake operating shafts 46 and 47, each comprising two parts, which are ordinarily located in line with the spring 16. To allow for the installation of the spring 16 a yoke 48 is fastened to the brake shafts 46 and 47. This allows for the operation of the brake shafts 46 and 47 around the ends of the spring 16.

The trunnion shaft 7 projects from the inner side of the spring seat 11 and has a bracket 49 suitably mounted upon it. A shaft 50 is suitably mounted in the bracket 49 and brake levers 51 are mounted on the shaft 50. The bracket 49 allows for locating the eyes 52 of the brake levers 51 in the most advantageous position to minimize any relative displacement of the eyes 52 caused by the oscillating travel of the axles 1 and 2 about the trunnion shaft 7. Two sets of brakes, as shown, may be used in each of the four wheels 72, one set for service used and one set for emergency use. Push rods 53 connect the brake levers 51 with the levers 54 which are mounted on the brake operating shafts 46 and 55 on the front driving axle while the pull rods 56 connect the levers 54 with the levers 57 which are mounted on the brake operating shafts 47 and 58 on the rear driving axle. To take care of any relative displacement of the eyes 52 of the levers 51 which may occur, a spring yoke 59 is mounted on and operated by the pull rods 56. A yoke 60 fits over the pull rod 56, being held thereon by the nut 62. A spring 63 is interposed between the sliding washer 61 and the yoke 60. The pull of the rod 56 on the washer 61 through the nut 62 will slightly compress the spring 63 in the ordinary operation of the brakes. Any displacement of the eyes 52 of the brake levers 51 will cause them to elongate or compress thus automatically shortening and lengthening the pull rod 56 and maintaining efficient brake operation. The brake levers 51 are further connected by the pull rods 64 to idler brake levers 65 which are suitably mounted in the frame 3 at a point high enough to allow the axle 1 to oscillate until it strikes the bumper block 67 without interfering with the pull rods 64. The idler brake levers 65 are connected by pull rods 66 to the ordinary brake cross shaft assembly 68 which is commonly used in four wheel trucks and from thence connections are suitably made to the brake operating pedals and levers.

In Fig. 12, the wheels are shown travelling over the uneven road surfaces 69 and the resulting position of the shackle 42, when two of the wheels 72 are occupying positions, as shown by dotted lines at 70 and 71. The installation of only one shackle 42 on each axle housing makes possible the neutralizing of the torque reaction in the axle housings by means of the vehicle supporting springs.

The foregoing description shows the invention in detail, in order that the invention may be clearly displayed but it is not intended that the design be restricted or confined to the said details, but is understood that it may be modified and changed to meet the individual manufacturer's needs or desires without departing from the scope or spirit of the invention.

I claim:

1. In a vehicle driving truck comprising a plurality of driven axles each provided with a housing, a shackle pivotally mounted on each of the said housings, a vehicle frame, a plurality of brackets suitably mounted on the said frame, a trunnion shaft suitably mounted in the said frame brackets, a plurality of supporting springs mounted on and adapted to oscillate on the said trunnion shafts, one of each pair of the said supporting springs being pivotally connected at its ends to the ends of the said housings and one of each pair of the said supporting springs being pivotally connected, at its ends, to the said shackle and to the ends of the said housings.

2. In a vehicle driving truck, the combination of a vehicle frame, a plurality of brackets suitably fastened to the said vehicle frame, the said brackets having a boss with oppositely disposed thrust faces, the said thrust faces being parallel with the sides of the vehicle frame, a trunnion shaft suitably mounted in the boss on the said brackets, the ends of the said trunnion shaft projecting beyond the said thrust faces, an oscillating housing mounted on the projecting ends of the said trunnion shaft, the said oscillating housing having oppositely disposed thrust faces engaging the thrust faces on the said frame brackets and being further provided with a spring seat above and below its oscillating center, and supporting springs suitably mounted on each of the spring seats on the said oscillating housing.

3. In a vehicle driving truck with the combination of a vehicle frame, a plurality of brackets suitably fastened to the said vehicle frame, the said brackets having a boss with a plurality of thrust faces, the said thrust faces being parallel with the sides of the vehicle frame, a trunnion shaft suitably locked in the boss on the said bracket, the ends of the said trunnion shaft projecting from the said thrust faces, a yoke adapted to oscillate on the projecting ends of the said trunnion shaft, the said yoke having thrust faces adapted to contact with the thrust faces on the boss of the said bracket, the said yoke being further provided with a spring seat, and a support bracket suitably mounted on the open ends of the yoke, the said support bracket being provided with a spring seat.

4. In a vehicle driving truck, a plurality of driven axles each provided with a housing, a vehicle frame, an oscillating housing suitably connected to the said vehicle frame and having a spring seat above and a spring seat below its oscillating center, the spring seats on the said oscillating housing being further provided with spring retaining flanges at their sides and a recess at their center, supporting springs mounted between the retaining flanges of the spring seats on the said oscillating housing, the said supporting springs comprising a plurality of thin and relatively wide resilient members, each interlocked to its adjacent member, and having a projecting nib on each of its outside members, one of the said projecting nibs entering the recess at the center of each spring seat on the said oscillating housing, brackets mounted on each of the said supporting springs, the said brackets each having a spring seat provided with spring retaining flanges at its sides and a recess at its center, the said recess engaging one of the projecting nibs on the outside members of the said supporting springs, and spring clips mounted in the said brackets, the said spring clips, positively locking the said brackets and the said supporting springs to the said oscillating housing.

5. In a vehicle driving truck, having axles each provided with a housing, a plurality of spring anchorage brackets mounted above the said axle housing, spring anchorage brackets mounted below the said axle housing, a spring shackle pivotally mounted to one of the said spring anchorage brackets on each housing, a vehicle frame, a trunnion bracket suitably mounted on each side of the said vehicle frame, a double spring seat bracket oscillating on each of the said trunnion brackets, and a pair of supporting springs mounted on the said double spring seat bracket, one of the said supporting springs being pivotally connected to the said spring shackle and one of the said spring anchorage brackets, and one of the said supporting springs being pivotally connected to one of the said spring anchorage brackets on each housing.

6. In a vehicle driving truck, two driven axles each provided with a housing, a spring shackle pivotally connected to each housing at diagonally opposite ends, a vehicle frame, a trunnion bracket suitably mounted on each side of the said vehicle frame, a swivelling bracket mounted on the said trunnion bracket, a pair of double cantilever springs suitably mounted on each of the said swivelling brackets, one of the said pair of double cantilever springs being above and one of the said pair of double cantilever springs being below the swivel center of the said swivelling bracket, the said pair of double cantilever springs being further pivotally connected, at their ends, to one of the said shackles and the housings of the two driven axles, the said double cantilever springs thereby supporting the said vehicle frame and neutralizing the torque developed in the housings of the said driven axles.

7. In a vehicle driving truck, a plurality of driven axles, each provided with a housing, a shackle pivotally connected to each of the said housings, a vehicle frame, and means for resisting the torque developed in the said housings, the said means comprising two supporting springs suitably connected to the said vehicle frame and pivotally connected to the housings of the said driven axles, one of the said supporting springs being connected above and one of the said supporting springs being connected below the horizontal centers of the said housings, together with two supporting springs suitably connected to the said vehicle frame, each pivotally connected to one of the said housings and one of the said shackles, one of the said supporting springs being connected to the said shackle and said housing at points above and one of the said supporting springs being connected to the said shackle and said housing at points below the horizontal centers of the said housings.

8. In a vehicle driving truck, the combination of two driven axles, a housing surrounding each axle, a shackle pivotally connected to one end of each of the housings, said shackles each having a pair of spaced arms, two pairs of spaced arms connected to the other end of each of the housings of the said driven axles, said pairs of spaced arms being located above and below the horizontal center line of the said driven axles respectively, a pair of spaced arms connected to the first mentioned end of each of the housings, said last named pair of spaced arms being oppositely disposed from said shackles in relation to the horizontal center line of the said driven axles, a pair of supporting springs connected to said vehicle frame adjacent each side thereof, the ends of said springs being pivotally connected respectively to said spaced arms and said shackles.

9. In a vehicle driving truck, the combination of a plurality of driven axles, a housing surrounding each axle, upper and lower brackets mounted on the housings of the said driven axles and each including a pair of spaced arms, a vehicle frame, a pair of upper and lower supporting springs arranged adjacent each side of and supported by said vehicle frame, said springs having their ends arranged adjacent the arms of the said brackets, and pivot pins transversely mounted in the arms of said brackets, the said pivot pins supporting the ends of said springs and fixed against longitudinal movement with respect to at least three of the ends of each pair of springs.

10. In a vehicle driving truck, the combination of a pair of driven axles, a housing surrounding each axle, supporting brackets carried by and extending above and below one end of one housing and the opposite end of the other housing, a supporting bracket extending below the other end of one housing, a supporting bracket extending above the other end of the other housing, a bearing bracket carried by and extending above and below the last named ends of each of said housings, a shackle pivotally connected at one end to each of said bearing brackets, said shackles and said supporting brackets each including a pair of spaced arms, a vehicle frame, a pair of supporting springs mounted upon said frame adjacent opposite sides thereof, the springs of each pair being arranged above and below the axles respectively, each end of each spring being arranged between one pair of said arms, and a pivot pin connecting each end of each spring with its corresponding pair of arms.

11. In a vehicle driving truck, the combination of two driven axles, a housing surrounding each axle, a spring shackle pivotally connected to one housing adjacent one end thereof, a spring shackle pivotally connected to the opposite end of the other housing, a vehicle frame, brackets mounted on the said vehicle frame, trunnion shafts mounted in said brackets, a pair of springs mounted adjacent their centers upon and adapted to oscillate on each trunnion shaft, one end of one spring of each pair being pivotally connected to one of said spring shackles, the other ends of said springs being pivotally connected to said housings, and fixed thereto against longitudinal movement with respect to said frame.

12. In a vehicle driving truck the combination of a vehicle frame, a bracket carried by said vehicle frame, said bracket including an attaching flange, side arms extending therefrom and a central boss carried by said arms and provided with oppositely disposed thrust faces, a trunnion shaft mounted in said boss, the ends of said trunnion shaft projecting beyond said boss, the inner end of the said trunnion shaft extending between said side arms, an oscillating housing mounted on the ends of said trunnion shaft, said housing having oppositely disposed thrust faces engaging the thrust faces on said boss, and spring seats on said oscillating housing above and below the said trunnion shaft.

13. In a vehicle driving truck, the combination of a vehicle frame, a supporting bracket carried by said vehicle frame, said supporting bracket including an attaching flange secured to the frame and a projecting portion extending outwardly from and connected between the ends of the said attaching flange to provide a space therebetween, the projecting portion of said bracket being provided with an inner and an outer thrust face, a trunnion shaft carried by the projecting portion of said bracket and projecting beyond the thrust faces thereof, the inner end of the said shaft extending within the said space, an oscillating housing mounted on the projecting ends of the said trunnion shaft, the said oscillating housing having thrust faces engaging the inner and outer thrust faces of said supporting bracket, and spring seats arranged above and below said housing and secured thereto.

14. In a vehicle driving truck, the combination of a vehicle frame, a supporting bracket carried by said vehicle frame, said bracket comprising an attaching flange and a projecting portion extending outwardly from and connected between the ends of the said attaching flange, a trunnion shaft mounted in the projecting portion of said supporting bracket substantially centrally, and extending outwardly from opposite sides thereof, spring seats adapted to oscillate about the projecting ends of the said shaft, said bracket being provided with a clearance space between the attaching flange and the central portion of the projecting portion of said bracket, one of the ends of said trunnion shaft extending into said space, said clearance space being sufficiently large to permit said spring seats to oscillate on the said trunnion shaft.

15. In a vehicle driving truck, a supporting bracket including an attaching flange, an arm projecting between and secured at its ends to said attaching flange, and a supporting boss carried by the central portion of said arm and spaced from said flange, said boss being provided with a transverse opening and having its sides surrounding said opening forming oppositely disposed thrust faces, a shaft mounted in said opening and projecting beyond the ends thereof, and spring supporting means journalled on the ends of said shaft.

16. In a vehicle driving truck, the combination of a pair of driven axles, a housing surrounding each axle, a vehicle frame, and means for resisting the torque developed in the said housings, the said means comprising two supporting springs arranged adjacent opposite sides of said frame and connected thereto, said springs being arranged above and below said housings respectively, fixed members on said housings, the ends of said springs being pivotally connected to said members, and two supporting springs connected to the said vehicle frame and each pivotally connected at one end to one of said fixed members, said last named springs being arranged above and below said housings respectively, the other end of each of said last named springs being arranged adjacent one of said housings and adapted to partake of movement with respect thereto longitudinally of said frame, the pivot connections of said springs being fixed against longitudinal movement with respect to said frame.

GEORGE B. INGERSOLL.